(12) United States Patent
Etter

(10) Patent No.: US 8,559,619 B2
(45) Date of Patent: Oct. 15, 2013

(54) METHODS AND DEVICES FOR REDUCING SIDETONE NOISE LEVELS

(75) Inventor: Walter Etter, Wayside, NJ (US)

(73) Assignee: Alcatel Lucent, Paris (FR)

( * ) Notice: Subject to any disclaimer, the term of this patent is extended or adjusted under 35 U.S.C. 154(b) by 2114 days.

(21) Appl. No.: 10/163,359

(22) Filed: Jun. 7, 2002

(65) Prior Publication Data

US 2003/0228013 A1  Dec. 11, 2003

(51) Int. Cl.
*H04M 1/00* (2006.01)
*H04M 9/00* (2006.01)

(52) U.S. Cl.
USPC .................... 379/392.01; 379/391

(58) Field of Classification Search
USPC ............................................ 379/391, 392.01
See application file for complete search history.

(56) References Cited

U.S. PATENT DOCUMENTS

| | | | |
|---|---|---|---|
| 4,081,620 A | 3/1978 | Goodman et al. | |
| 5,640,450 A | 6/1997 | Watanabe | |
| 5,918,185 A | 6/1999 | Knoedl, Jr. | |
| 5,946,391 A | 8/1999 | Dragwidge et al. | |
| 6,151,391 A | 11/2000 | Sherwood et al. | |
| 6,363,344 B1 * | 3/2002 | Higuchi | 704/226 |
| 2002/0090078 A1 * | 7/2002 | Feltstrom et al. | 379/390.01 |

OTHER PUBLICATIONS

U.S. Appl. No. 09/956,954, filed Sep. 21, 2001, Walter Etter.
U.S. Appl. No. 09/107,919, filed Jun 30, 1998, Etter.
W. Etter, G-S. Moschytz "Noise Reduction by Noise—Adaptive Spectral.." Audio Eng. Soc., vol. 42, No. 5, May 1994 pp. 341-349.
W. Etter, "Contribution to Noise Supression in Mono-phonic Speech," ETH, Diss. N. 10210, Zurich 1993.

* cited by examiner

*Primary Examiner* — Alexander Jamal
(74) *Attorney, Agent, or Firm* — Capitol Patent & Trademark Law Firm, PLLC

(57) ABSTRACT

The sidetone noise level in a wireless or wired telephone, for example, is reduced by adjusting both noise and signal levels and/or by improving the signal-to-noise ratio of such signals.

26 Claims, 3 Drawing Sheets

METHODS AND DEVICES FOR REDUCING SIDETONE NOISE LEVELS

BACKGROUND OF THE INVENTION

A sidetone is a portion of a sound signal which is fed from a telephone's mouthpiece (i.e., microphone) back to an earpiece (i.e., loudspeaker). For the most part, all wired phones generate such a sidetone. Sidetones have a significant effect on the perceived quality of a telephone connection. When a person using a telephone hears a sidetone it gives her a sense of confidence that her phone and the network she is speaking "over" are working properly.

In an ideal case, a sidetone signal consists of the voice of the person who is speaking into the telephone or the like. However, when background noise is present the sidetone signal also includes background sounds.

For wireless or mobile telephones, sidetones become more problematic because they are often used in noisy environments (e.g., noise from cars, trains, airports, streets). For the sake of simplicity, and to avoid background noise problems, many manufacturers have decided to build wireless phones that provide no sidetone signals, thereby accepting the degradation in quality which occurs in noise-free environments. It is desirable, however, to generate sidetone signals that do not negatively impact a telephone conversation in a noisy environment.

Some have attempted to reduce sidetone noise by incorporating circuits which eliminate the sidetone altogether when a listener does not speak into a telephone within a certain timeframe. This technique is confusing to some users because the sounds coming from such a telephone's earpiece appear to cut in and out. Other techniques have been developed but they all have their drawbacks.

Accordingly, it is a desire of the present invention to provide for improved techniques for reducing sidetone noise levels.

Other desires of the present invention will become apparent from the drawings, detailed description of the invention and claims which follow.

SUMMARY OF THE INVENTION

In accordance with the present invention there are provided techniques for reducing sidetone noise levels including a technique comprising: a noise estimation unit adapted to estimate a noise level of a near-end signal; a sidetone gain computation unit adapted to generate an adjustment factor based on the estimate; a sidetone gain control unit adapted to generate a sidetone signal comprising adjusted noise and signal levels using the generated adjustment factor; and a sidetone mixer adapted to output a far-end signal and the adjusted, sidetone signal. This first technique reduces the noise level of a sidetone signal while keeping the SNR of the sidetone signal the same. Alternatively, such a device may also comprise one or more noise reduction units adapted to generate sidetone signals having improved SNRs. A noise reduction unit can be also further adapted to transmit near-end signals with improved SNRs to a far-end as well.

DETAILED DESCRIPTION OF THE INVENTION

Figure 1:
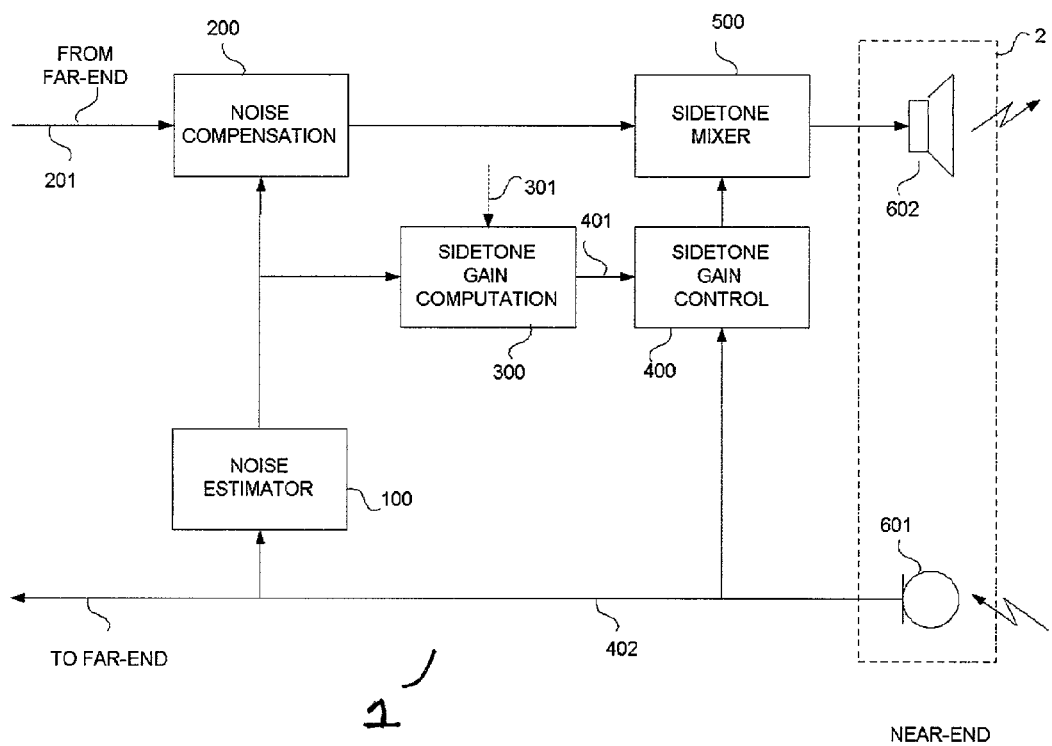
FIG. 1 depicts a simplified block diagram of a technique for reducing sidetone noise levels according to one embodiment of the present invention.

Referring to FIG. 1, there is shown a device 1 which is adapted to reduce sidetone noise levels according to one embodiment of the present invention. The device 1 may comprise one or more electronic circuits, application specific integrated circuits, digital signal processors or one or more modules used within a wired or wireless device (e.g., telephone). In general, the device 1 is adapted to detect near-end sound signals using a near-end microphone 601 and to transmit such signals to a far-end caller while at the same time receiving far-end sound signals from the caller which are output to the ear of a listener via near-end loud speaker(s) 602.

Device 1 comprises a noise estimation unit 100, noise compensation unit 200, sidetone gain computation unit 300, sidetone gain control unit 400, sidetone mixer 500 and the microphone/loud speaker combination, 601,602 mentioned above. Though shown as individual units, some or all of the units 100-602 may be combined or, alternatively, further broken down into additional units. It should also be understood that all of the components shown in FIG. 1 may be part of one device such as a wireless/mobile telephone handset or more than one device, such as a wire line (e.g., land line) handset and base combination.

Throughout the discussion above and below, the terms "far-end" and "near-end" are used. It should be understood that by "far-end" is meant the location from which a communication signal (e.g., telephone call) originates (in reality it can originate from a nearby location or at the near-end), or locations where such a signal is sent, which does not necessarily have a device envisioned by the present invention (though it may). By "near-end" is meant the location at which sidetone signals are generated by devices envisioned by the present invention.

In one embodiment of the present invention, device 1 operates as follows. A far-end caller (not shown) originates a far-end telephone call which is transmitted as a far-end signal via pathway 201 to the device 1. The far-end signal 201 is received using techniques known in the art and is eventually output via loudspeaker 602 to the ear of a listener. The far-end signal may be processed by a noise compensation unit 200 before being processed by a sidetone mixer 500. The unit 200 is adapted to provide noise compensation using one or more methods, for example, using the techniques disclosed in U.S. patent application Ser. No. 09/956,954. Thereafter, the user of device 1 inputs a near-end signal (e.g., says "hello") into device 1 via microphone 601. The voice signals spoken by the user of device 1 are sent from the microphone 601 to a noise estimator 100 and sidetone gain control unit 400. As mentioned above, background sounds are also detected and input into device 1 via microphone 601. Both the words (i.e., voice signals) spoken by the user of device 1 and background sounds (collectively referred to as the "near-end" signal) are sent from the microphone 601 to a noise estimator 100 and sidetone gain control unit 400. Upon receiving these signals, the noise estimator 100 is adapted to estimate the noise level of the near-end signal.

The noise level estimated by unit 100 is sent to the sidetone gain computation unit 300. In an illustrative embodiment of the present invention, unit 300 is adapted to generate a sidetone gain value by using a substantially inverse relationship of noise level and sidetone gain. That is, the higher the near-end noise level, the lower the sidetone gain value.

It should be noted that the present invention also envisions an optional input 301 so that a user can change the generated sidetone gain value. For example, if a user hears a sidetone which is uncomfortable for her, she may adjust the noise level via input 301 to unit 300. The user may, for example, increase or decrease the generated sidetone gain value. It could also be set to a fixed level regardless of the computed sidetone gain. To accommodate this, unit 300 is adapted to receive this input via pathway 301 and to vary the generated gain value accordingly. That is, when the amount of gain to be added to the sidetone signal by unit 300 is based at least in part on input via pathway 301, the noise level estimated by unit 100 becomes one of two inputs used to generate the sidetone gain value.

In more detail, the computation unit 300 outputs the generated gain value as an "adjustment factor" to the sidetone gain control unit 400 in order to adjust a near-end, sidetone signal (which may be comprised of voice and noise levels). Control unit 400 is adapted to adjust the levels (i.e., amplify or attenuate) of the sidetone signal (both noise and signal) in accordance with the received adjustment factor. The resulting, adjusted sidetone signal is then generated and output to sidetone mixer 500. Sidetone mixer 500 is adapted to mix a far-end signal received via pathway 201 with the adjusted sidetone signal and to output both to loudspeaker 602.

Figure 2:
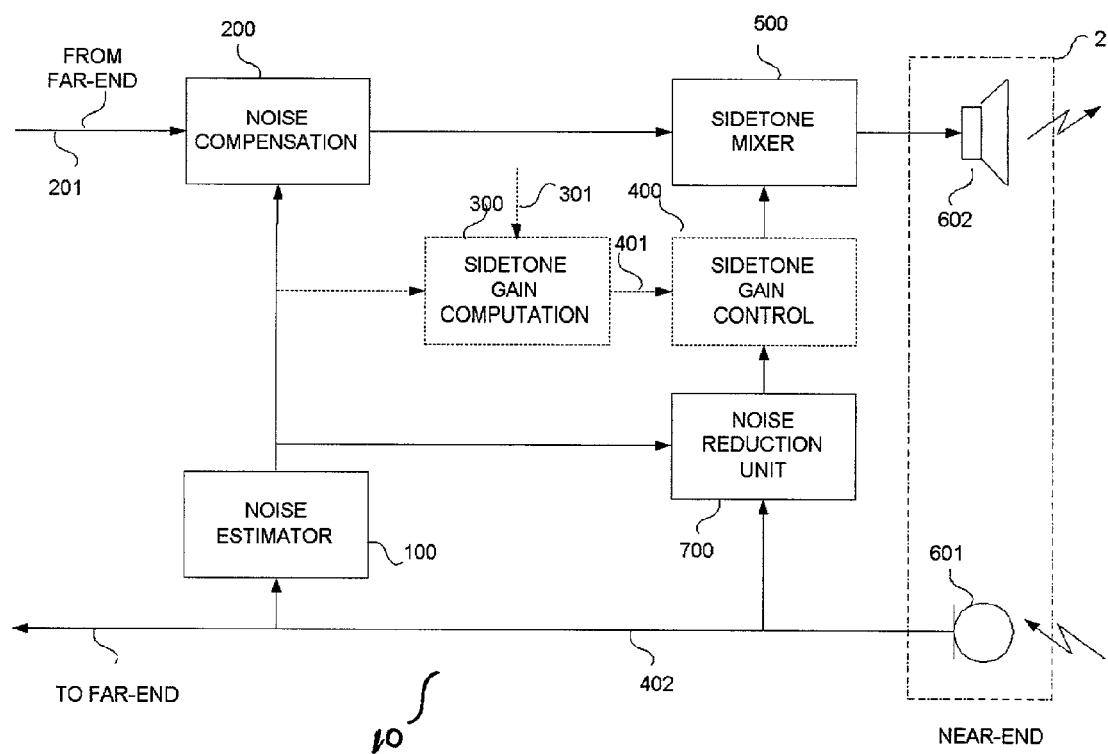
FIG. 2 depicts a simplified block diagram of a technique for reducing sidetone noise levels using a near-end signal with an improved signal-to-noise ratio ("SNR") according to one embodiment of the present invention.

FIG. 2 depicts an alternative device 10 according to another embodiment of the present invention. The device 10 is similar to the device shown in FIG. 1 except that the device 10 comprises an extra element, that being a noise reduction unit 700. The noise reduction unit 700 is placed in between the microphone 601 and sidetone gain control 400. So placed, the noise reduction unit 700 is adapted to reduce the noise level of the input signal which will eventually be used to generate the sidetone signal. In more detail, the signal input into the noise reduction unit 700 from microphone 601 may contain both a signal and noise portion. The noise reduction unit 700 is adapted to reduce the level of the noise portion thereby increasing the overall SNR of the signal. This signal with its improved SNR will be used as a sidetone signal. Once the noise level has been reduced, the noise reduction unit 700 is adapted to output this sidetone signal with its improved SNR to the sidetone gain control unit 400.

It should be noted that the gain computation unit 300 is an optional component of device 10 because it may no longer be necessary to further adjust or reduce the noise level of the sidetone signal. In an alternative embodiment of the present invention, unit 300 is adapted to generate an adjustment factor (i.e., gain value) to further adjust the noise level of a sidetone signal if the noise reduction unit 700 fails to reduce the noise by a sufficient amount or if the noise reduction unit 700 is preset to only moderately reduce the noise.

In general, the more unit 700 reduces the noise level (improves the SNR) of the near-end signal (which becomes the sidetone signal) the less need there is to adjust the gain using unit 300.

Unit 400 is thereafter adapted to generate and output a level adjusted, improved SNR sidetone signal to sidetone mixer 500 which is eventually output via loudspeaker 602.

Figure 3:
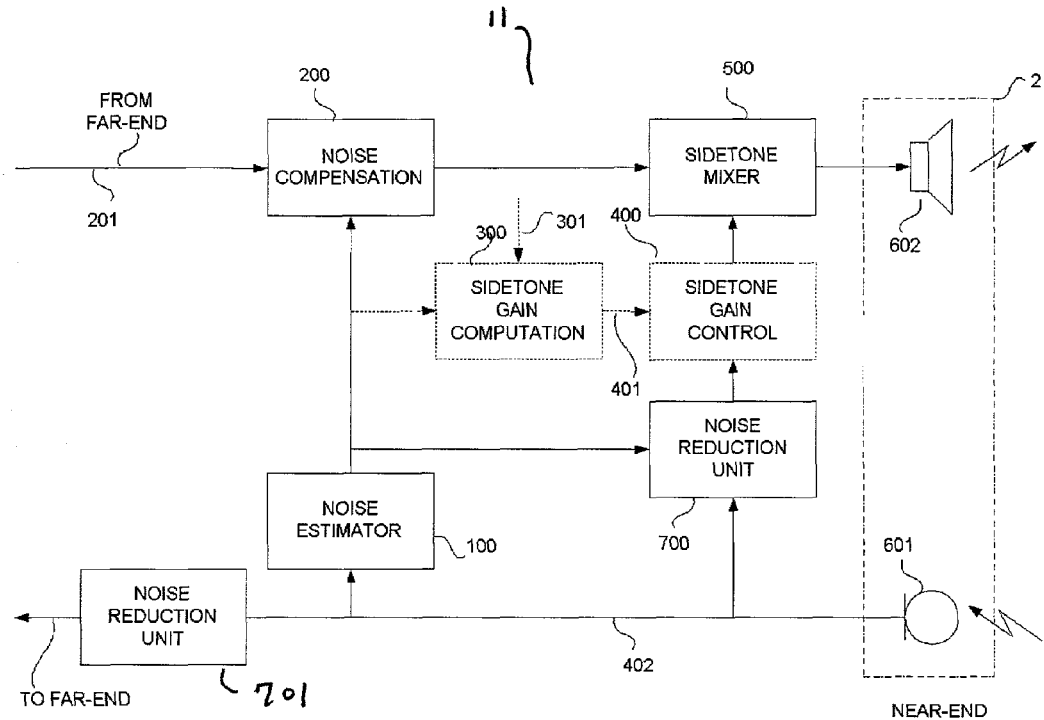
FIG. 3 depicts a simplified block diagram of a technique for reducing sidetone noise levels, and improving the SNR of a sidetone signal and a transmittal near-end signal, according to one embodiment of the present invention.

Referring now to FIG. 3, it can be seen that a second noise reduction unit 701 has been added to a device 11. Noise reduction unit 701 is adapted to output an improved SNR, near-end signal to a far-end. It should be noted that the signals output by units 700,701 need not be identical. That is, each noise reduction unit 700,701 is adapted to be optimized to conform to its own set of requirements. For example, one requirement for sidetone noise reduction unit 700 may be that any delay introduced through estimator 100 be less than 8 ms. If the introduced delay is larger, a user of a telephone incorporating device 11 may notice a delay and perceive the sidetone as an echo. On the other hand, the delay introduced by the "transmit" noise reduction unit 701 may be less stringent.

In addition to performance issues, the decision to use one or two noise reduction units will also be driven by economics, design complexity and/or space constraints/limitation. To avoid confusion and for ease of understanding, unit 700 may be referred to as the "first" noise reduction unit and unit 701 as the "second" noise reduction unit.

Figure 4:
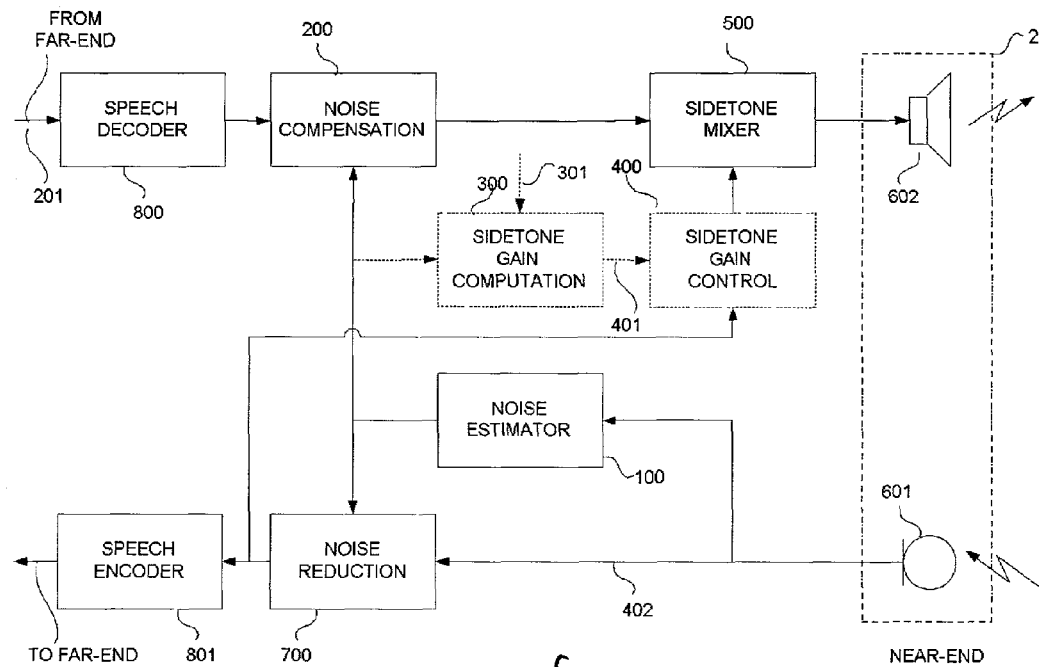
FIG. 4 depicts an alternative embodiment of the technique shown in FIG. 3 according to yet another embodiment of the present invention.

Another example of the ideas envisioned by the present invention is shown in FIG. 4. As shown, a device 110 comprises the same components as shown in FIG. 3 with the exception that speech decoder 800 and encoder 801 have been added and the number of noise reduction units has been reduced from two to one. Device 110 will typically be used in a cellular telephone. It should be noted that there is usually no need for the decoder/encoders 800,801 if the device 110 is not a cellular telephone.

In this embodiment, the noise reduction unit 700 is adapted to output a sidetone signal having an improved SNR to the near-end loudspeaker 602 via units 300, 400 and 500 and to output a near-end signal having an improved SNR to a far-end caller/listener via near-end speech encoder 801. In this manner, the SNR of both the near-end, sidetone signal and the near-end signal transmitted by a cellular telephone and the like to a far-end are improved.

The devices depicted in FIGS. 1-4 may comprise one or more circuits, ICs, digital signal processors, microprocessors or the like making up, for example, a cellular device (e.g., telephone). Sidetone signals are important in all types of telephones regardless of the transmission medium used (i.e., standard public telephone network, Internet, public and private wireless networks). As such, devices envisioned by the present invention may comprise any type of telephone such as a wired, mobile, cordless and/or cellular telephone. In addition, devices envisioned by the present invention may comprise any telephone design/component such as a handset, headset, base or speakerphone.

The features of the present invention have been illustrated by the examples given above. Modifications may be made to these examples without departing from the spirit and scope of the present invention. For example, a noise reduction unit may be adapted to provide a variable amount of noise reduction. With that said, the scope of the present invention is determined by the claims which follow:

I claim:

1. A device for at least reducing sidetone noise levels comprising:
    a noise estimation unit adapted to estimate a noise level of a near-end signal that includes both voice and background signals;
    a sidetone gain computation unit adapted to generate an adjustment factor based on the estimate;
    a sidetone gain control unit adapted to generate a sidetone signal consisting of adjusted noise and signal levels of the near end signal using the generated adjustment factor; and
    a sidetone mixer adapted to output the adjusted, sidetone signal to the near-end.

2. The device as in claim 1 wherein the device comprises one or more digital signal processors.

3. The device as in claim 1 wherein the device comprises one or more application specific, integrated circuits.

4. The device as in claim 1 wherein the device comprises a wired telephone.

5. The device as in claim 1 wherein the device comprises a wireless telephone.

6. The device as in claim 1 further comprising a noise reduction unit adapted to reduce the noise level of the near-end signal, where the sidetone gain control unit is further adapted to output a sidetone signal having an improved SNR to the near-end.

7. The device as in claim 1 further comprising a first noise reduction unit adapted to reduce the noise level of the near-end signal, and where the sidetone gain control unit is further adapted to output a sidetone signal having an improved SNR to the near-end.

8. The device as in claim 7 further comprising a second noise reduction unit adapted to output a near-end signal to a far-end having an improved SNR, where the noise levels of the sidetone and output near-end signal need not be the same.

9. The device as in claim 1 wherein the sidetone gain control unit is further adapted to generate the sidetone signal without using the adjustment factor.

10. The device as in claim 1 further comprising a noise reduction unit adapted to reduce the noise level of the near-end signal, and to output a near-end signal having an improved SNR to a far-end, where the sidetone gain control unit is further adapted to generate a sidetone signal having an improved SNR and where noise levels of the sidetone and output near-end signal need not be the same.

11. The device as in claim 1 wherein the sidetone gain computation unit is further adapted to generate an adjustment factor based on user input.

12. A device for at least reducing sidetone noise levels comprising:
one or more noise reduction units adapted to reduce the noise level of a near-end signal;
a sidetone gain control unit adapted to generate a signal consisting of a sidetone signal of the near-end signal having an improved SNR; and
a sidetone mixer adapted to output the sidetone signal to the near-end.

13. The device as in claim 12 further comprising:
a noise estimation unit adapted to estimate a noise level of the near-end signal that includes both voice and background signals; and
a sidetone gain computation unit adapted to generate an adjustment factor based on the estimate or on user input, where the control unit is further adapted to generate the sidetone signal using the adjustment factor.

14. The device as in claim 12 wherein one of the noise reduction units is further adapted to output a near-end signal with an improved SNR to a far-end, where the noise levels of the sidetone and output near-end signal need not be the same.

15. A method for at least reducing sidetone noise levels comprising:
estimating a noise level of a near-end signal that includes both voice and background signals;
generating an adjustment factor based on the estimate;
generating a sidetone signal consisting of adjusted noise and signal levels of the near-end signal using the generated adjustment factor; and
further outputting the adjusted, sidetone signal to the near-end.

16. The method as in claim 15 further comprising:
reducing the noise level of the near-end signal; and
further generating a sidetone signal having an improved SNR.

17. The method as in claim 15 further comprising generating the sidetone signal without using the adjustment factor.

18. The method as in claim 16 further comprising outputting a near-end signal having an improved SNR to a far-end, where the noise levels of the sidetone and output near-end signal need not be the same.

19. The method as in claim 15 further comprising:
reducing the noise level of the near-end signal;
further outputting a near-end signal having an improved SNR to a far-end; and
further generating a sidetone signal having an improved SNR, where the noise levels of the sidetone and output near-end signal need not be the same.

20. The method as in claim 15 further comprising generating an adjustment factor based on user input.

21. A method for at least reducing sidetone noise levels comprising:
reducing the noise level of a near-end signal that includes both voice and background signals;
generating a signal consisting of a sidetone signal of the near-end signal having an improved SNR; and
further outputting the sidetone signal to the near-end.

22. The method as in claim 21 further comprising:
estimating a noise level of a near-end signal;
generating an adjustment factor based on the estimate or on user input; and
further generating the sidetone signal using the adjustment factor.

23. The method as in claim 21 further comprising outputting a near-end signal with an improved SNR to a far-end, where the noise levels of the sidetone and output near-end signal need not be the same.

24. The device as in claim 1 wherein the sidetone mixer is further adapted to output the adjusted, sidetone signal to a near-end audio output device.

25. The device as in claim 24 wherein the audio output device is a loudspeaker.

26. The device as in claim 1 wherein the sidetone mixer is further adapted to output the adjusted, sidetone signal to a near-end user.

* * * * *